(12) United States Patent
Yoshiguchi et al.

(10) Patent No.: US 9,735,578 B2
(45) Date of Patent: Aug. 15, 2017

(54) METHOD OF LOAD SHEDDING IN AIRCRAFT AND CONTROLLER

(71) Applicant: Mitsubishi Aircraft Corporation, Aichi (JP)

(72) Inventors: Takuya Yoshiguchi, Aichi (JP); Makoto Goto, Aichi (JP); Daisuke Sato, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 393 days.

(21) Appl. No.: 14/339,012

(22) Filed: Jul. 23, 2014

(65) Prior Publication Data

US 2015/0045978 A1    Feb. 12, 2015

(30) Foreign Application Priority Data

Aug. 7, 2013  (JP) .................................. 2013-163988

(51) Int. Cl.
*G06F 19/00* (2011.01)
*H02J 3/14* (2006.01)

(52) U.S. Cl.
CPC ............ *H02J 3/14* (2013.01); *B64D 2221/00* (2013.01)

(58) Field of Classification Search
CPC ........... H02J 3/14; G05F 5/00; B64D 2221/00
See application file for complete search history.

(56) References Cited

U.S. PATENT DOCUMENTS

| | | | |
|---|---|---|---|
| 5,422,517 A | 6/1995 | Verney et al. | |
| 2006/0129798 A1* | 6/2006 | Bance | G02B 19/048 713/2 |
| 2009/0096431 A1* | 4/2009 | Verschuur | H02P 9/06 322/8 |
| 2010/0217913 A1* | 8/2010 | Stoner | H04B 10/807 710/313 |
| 2012/0235470 A1* | 9/2012 | Prisse | H02J 3/26 307/9.1 |
| 2013/0154357 A1* | 6/2013 | Schult | B60R 16/03 307/9.1 |

(Continued)

FOREIGN PATENT DOCUMENTS

JP        H08-511933 A       12/1996

OTHER PUBLICATIONS

Chuvychin, V. N., et al. "An adaptive approach to load shedding and spinning reserve control during underfrequency conditions." IEEE Transactions on Power Systems 11.4 (1996): 1805-1810.*

(Continued)

*Primary Examiner* — Michael D Masinick

(74) *Attorney, Agent, or Firm* — Pearne & Gordon LLP

(57) ABSTRACT

To properly execute load shedding in an aircraft to maintain power supply to more devices. A method of load shedding includes a failure detection step of detecting a failure in a generator, and a load-shedding step. The load-shedding step includes determination step, and execution step, respectively, the determination step in which the load shedding is determined to be needed if the state where a power consumption exceeds a power-generation capacity continues for a monitoring time, and the execution step in which the load shedding is executed step-by-step while advancing a priority given to a target device until the power consumption falls below the power-generation capacity.

10 Claims, 7 Drawing Sheets

(56) References Cited

U.S. PATENT DOCUMENTS

2013/0297089 A1* 11/2013 Fu .......................... G06F 1/26
700/295
2015/0036364 A1* 2/2015 Yoshiguchi .......... B60Q 3/0259
362/464

OTHER PUBLICATIONS

Rosero, J. A., et al. "Moving towards a more electric aircraft." IEEE Aerospace and Electronic Systems Magazine 22.3 (2007): 3-9.*
Butler, Karen L., et al. "Shipboard systems deploy automated protection." IEEE Computer Applications in Power 11.2 (1998): 31-36.*
Maasoumy, Mehdi, et al. "Optimal load management system for aircraft electric power distribution." 52nd IEEE Conference on Decision and Control. IEEE, 2013.*
Japanese Office Action for JP2013-163988 dated Mar. 28, 2017.

* cited by examiner

FIG. 3

| PRIORITY | TARGET DEVICE ID |
|---|---|
| 1 | XXXXXXXXX01 |
| 1 | XXXXXXXXX02 |
| 1 | XXXXXXXXX03 |
| 1 | XXXXXXXXX04 |
| 1 | XXXXXXXXX05 |
| 1 | XXXXXXXXX06 |
| 1 | XXXXXXXXX07 |
| 1 | XXXXXXXXX08 |
| 1 | XXXXXXXXX09 |
| 1 | XXXXXXXXX10 |
| 1 | XXXXXXXXX11 |
| 1 | XXXXXXXXX12 |
| 2 | XXXXXXXXX13 |
| 2 | XXXXXXXXX14 |
| 2 | XXXXXXXXX15 |
| 2 | XXXXXXXXX16 |
| 2 | XXXXXXXXX17 |
| 2 | XXXXXXXXX18 |
| 2 | XXXXXXXXX19 |
| 2 | XXXXXXXXX20 |
| 3 | XXXXXXXXX21 |
| 3 | XXXXXXXXX22 |
| 3 | XXXXXXXXX23 |
| 3 | XXXXXXXXX24 |
| 3 | XXXXXXXXX25 |
| 3 | XXXXXXXXX26 |
| 3 | XXXXXXXXX27 |
| 4 | XXXXXXXXX28 |
| 4 | XXXXXXXXX29 |
| 5 | XXXXXXXXX30 |

# METHOD OF LOAD SHEDDING IN AIRCRAFT AND CONTROLLER

BACKGROUND OF THE INVENTION

Field of the Invention

The present invention relates to a method of load shedding to cut off a power supply to devices included in an aircraft, and a controller for executing the load shedding.

Description of the Related Art

Each aircraft includes a plurality of generators for generating power from part of the rotation of an engine as a power source. During its flight, the power obtained from the generators is supplied to devices through a power supplying system.

However, when some of the generators become unable to generate or their power generation capabilities are reduced due to failures, they cannot meet the demand, which may result in an overload. At this point, when the generator stops with the assistance of a protective function, the main power supply of the aircraft is lost. In order to avoid this, the aircraft has a load shedding (Load Shed) function of intentionally cutting off the power supply to the devices having no influence on the flight thereof upon detecting a failure hindering the generator from generating the power, so as to avoid the loss of power.

SUMMARY OF THE INVENTION

Technical Problem

When devices to be subjected to the load shedding are selected, the rated maximum power consumptions of the devices are integrated, and a set of target devices are selected such that the integrated power falls below a power-generation capacity. When a failure in the generator is then detected, power supply to the set of target devices is cut off.

The devices however each consume in reality only about half of the rated power. As a result, after the load shedding is executed because some of the generators break down, the power-generation capacity obtained by remaining generators leaves a large margin.

In view of this, the present invention thus has an object to provide a method of load shedding and a controller which execute the load shedding in the aircraft more properly, so as to maintain power supply to more devices.

Solution to Problem

The present invention is a method of load shedding to cut off supply of power to a plurality of target devices selected from a device group, the power generated by generators included in an aircraft and supplied to the device group, the method of load shedding including a failure detection step of detecting a failure hindering the generator from generating power, and a load-shedding step, after the failure is detected in the failure detection step, of executing the load shedding on the basis of the determination of the necessity of the load shedding.

In the present invention, the load-shedding step includes a determination step of determining that the load shedding is needed on the basis that the state where power consumption consumed by the devices exceeds a predetermined power-generation capacity continues for a predetermined monitoring time, and an execution step of executing, if the load shedding is determined to be needed in the determination step, the load shedding step-by-step while advancing a priority given to the target devices until the power consumption falls below the power-generation capacity.

In the present invention, when a failure hindering the generator from generating power occurs and the capability of supplying the power to the devices included in the aircraft is reduced, the power supply to the devices is restricted step-by-step. In order to execute such load shedding, the load shedding is executed to the target devices up to a required priority after the necessity of the load shedding is determined on the basis of the monitoring power consumption.

Useless load shedding in light of the margin of the power-generation capacity can be thereby avoided, so as to maintain power supply to the target devices given higher priorities.

After the load shedding is once executed, the situation of power supply and demand varies due to fluctuation of the power consumption by, for example, operating control surfaces, so the load-shedding step can be repeatedly executed.

In the present invention, since the load shedding is executed to the target devices given a low priority in an ascending order, the target devices given higher priorities are not subjected to the load shedding depending on the situation of the power supply and demand. In addition, there is a grace period until the power supply is cut off and if the power supply is recovered by the return of the generator from the failure or the connection of an external power supply during the grace period, the target devices given the higher priorities can avoid being subjected to the load shedding even if the load shedding is to be executed, as long as they are not included in the first load shedding.

The priorities can be given to each of the target devices on the basis of any criterion.

For example, target devices used for servicing for passengers can be given a low priority, target devices having influence on comfortableness for the passengers can be given a priority corresponding to the degree of influence, and target devices having influence on a pilot can be given a high priority.

In the method of load shedding of the present invention, it is preferable that the load-shedding step includes a first period load-shedding step a processing time of which is in units of a predetermined first period, and a second period load-shedding step a processing time of which is in units of a second period longer than the first period.

In the first period load-shedding step, the power-generation capacity is set at a capacity in accordance with a property of the generators associated with the second period.

In the second period load-shedding step, the power-generation capacity is set at a capacity in accordance with the stationary property of the generators.

This configuration is defined on the basis of power-generation capacities represented by the short-time property and the stationary property of the generators, and a time based on the short-time property.

In general, the first period can be set at five seconds, and the second period can be set at five minutes.

Since the capacity of the generator associated with the second period is greater than a stationary capacity, a first period load shedding, which uses a capacity associated with the second period as a threshold value used for advancing the priority, leaves a larger margin of power-generation capacity than that of a second period load shedding, which uses the stationary capacity as the threshold value. As a result, in the first period load shedding, the load shedding can be limited to lower priorities. The target device given higher priorities can be thereafter continuously used for about a time equivalent to the second period until the second period load shedding is executed.

Here, in the first period load-shedding step, it is preferable that the monitoring time is set at a time obtained by subtracting a time defined as a time taken for cutting off the power supply to the target devices, from the first period, and in second period load-shedding step, it is preferable that the monitoring time is set at a time obtained by subtracting a time defined as a time taken for cutting off the power supply to the target devices, from the second period.

Since a predetermined period of time is taken for opening circuit breakers used for cutting off the power to the target devices, the power supply to the target devices to which the load shedding is needed can be securely cut off within the first period and the second period, respectively, by setting the monitoring time as described above.

In the method of load shedding of the present invention, in the execution step, it is preferable that the load shedding is executed until the power consumption falls below a failure period capacity set at a value lower than the power-generation capacity.

The load shedding can be thereby executed until the power consumption securely falls below the power-generation capacity.

The method of load shedding of the present invention includes an auxiliary power unit activation step, after the failure is detected in the failure detection step, of activating an auxiliary power unit including a generator, wherein the process of the load-shedding step can be interrupted when the generator of the auxiliary power unit starts generating power upon the completion of the activation of the auxiliary power unit.

As described above, there is a grace period for the target devices given higher priorities until the power supply is cut off, as long as they are not included in the first load shedding. Thus, if the activation of the auxiliary power unit is completed and the generator generates power to recover the power supply during the grace period, the target devices given the higher priorities can avoid being subjected to the load shedding.

The present invention is applicable to a controller for executing the load shedding in the aircraft.

The controller of the present invention is a controller for executing load shedding to cut off supply of power to a plurality of target devices selected from a device group, the power generated by generators included in an aircraft and supplied to the device group, the controller including a failure detecting section for detecting a failure hindering the generator from generating power, and a load shedding section for operating when the failure detecting section detects the failure.

In the present invention, the load shedding section includes a determining section for determining that the load shedding is needed on the basis that the state where power consumption consumed by the devices exceeds a predetermined power-generation capacity continues for a predetermined monitoring time, and an executing section for executing, if the determining section determines that the load shedding is needed, the load shedding step-by-step while advancing a priority given to the target devices until the power consumption falls below the power-generation capacity.

The controller of the present invention can be optionally configured as long as the functions thereof can be implemented. The failure detecting section and the load shedding section can be implemented in the same device or imple-
mented in separated devices. In addition, the controller of the present invention can be built in, for example, electronic distribution devices.

The aircraft of the present invention includes the above-described controller.

The controller included in the aircraft executes the above-described method of load shedding, by which the same functions and effects as those described above are obtained.

Advantageous Effect of Invention

According to the present invention, the load shedding in the aircraft can be executed more properly, and the power supply to more devices can be maintained.

BRIEF DESCRIPTION OF THE DRAWINGS

FIG. 3 is a diagram showing table data representing correspondences between target devices to be subjected to load shedding and priorities;

DETAILED DESCRIPTION OF THE PREFERRED EMBODIMENTS

The embodiment according to the present invention will be described below with reference to the drawings.

Figure 1:
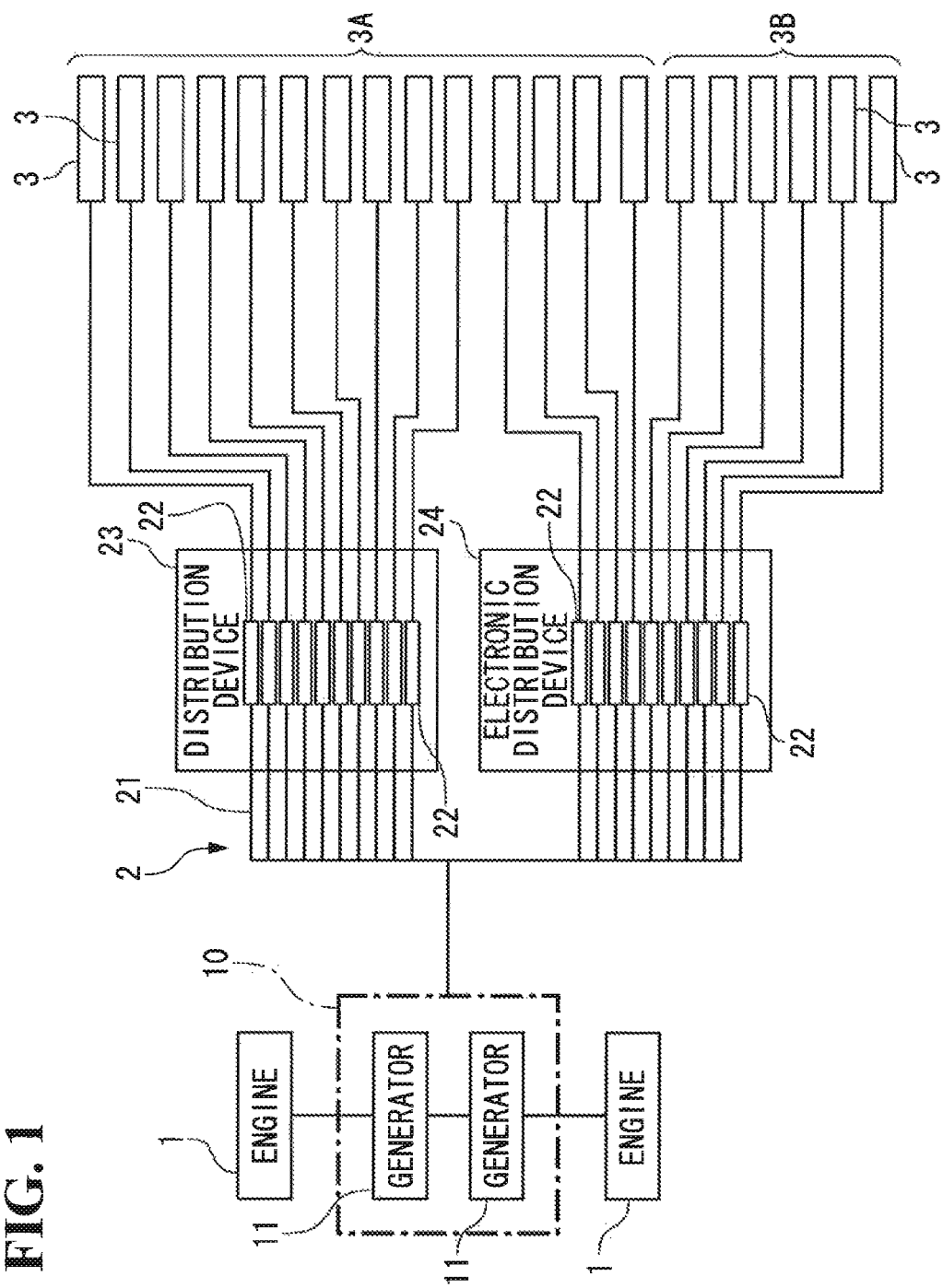
FIG. 1 is a block diagram showing a configuration regarding to power supply in an aircraft being an embodiment of the present invention.

An aircraft according to the present embodiment includes, as shown in FIG. 1, two engines 1 and 1, and generators 11 and 11 provided in the engines 1 and 1, respectively.

Each of the generators 11 and 11 generates AC power from part of the rotation of the engine 1 as a power source. The two generators 11 and 11 operate in parallel, forming one power supply 10.

The power generated by these generators 11 and 11 is supplied to a large number of devices (electrical loads) 3 constituting a device group, through the power supplying system 2. Note that only some of the large number of devices 3 are shown.

Each of the generators 11 and 11 has a power-generation capacity of W (under normal operation conditions). The generators 11 and 11 form the power supply 10 having a power-generation capacity of 2 W.

These generators 11 and 11 generate the power up to the maximum capacity of 2W in total in conformity with the power consumption of the devices 3.

Here, the generator 11 has, in addition to the stationary property, a five-second property representing a power-generation capacity allowable within the limit of five seconds, and a five-minute property representing a power-generation capacity allowable within the limit of five minutes. The stationary property represents a power-generation capacity (stationary capacity) W allowable consecutively beyond five minutes. A five-second capacity $W_{5S}$ corresponding to the five-second property, a five-minute capacity $W_{5M}$ corresponding to the five-minute property, and the stationary capacity W descend in this order.

A power supplying system 2 includes cable runs 21 connected to the devices 3, and circuit breakers 22, etc. provided in the cable runs 21, and supplies the devices 3 with the power generated by the generators 11 and 11.

Some of the large number of circuit breakers 22 are manually switched (shut off) in a distribution device 23, and the rest of them are electronically and automatically switched by an electronic distribution device 24.

When the circuit breakers 22 are opened and the cable runs 21 are opened, the power supply to the devices 3 connected to the cable runs 21 is cut off. The devices 3 are brought into an isolated state from the power supplying system 2.

The devices 3 are categorized into a plurality of devices 3A that are not to be subjected to load shedding, and a plurality of devices (target devices) 3B that are to be subjected to load shedding.

Some of the devices 3A include those such as instrument panels needed to control the aircraft, which are essential for the aircraft to fly, and those needed to carry passengers and crews safely.

Even if one of the generators 11 breaks down, the power of the power-generation capacity W generated by the remaining generator 11 can meet a maximum power consumption when all the devices 3A consume respective maximum powers thereof.

The target devices 3B are those, unlike the devices 3A, have no influence on the flight or the maintenance of safety, which are selected from among the devices 3 connected to the circuit breakers 22 in the electronic distribution device 24.

Each of the target devices 3B is given one of the priorities 1 to 5 to be described hereafter (FIG. 3).

Figure 2:
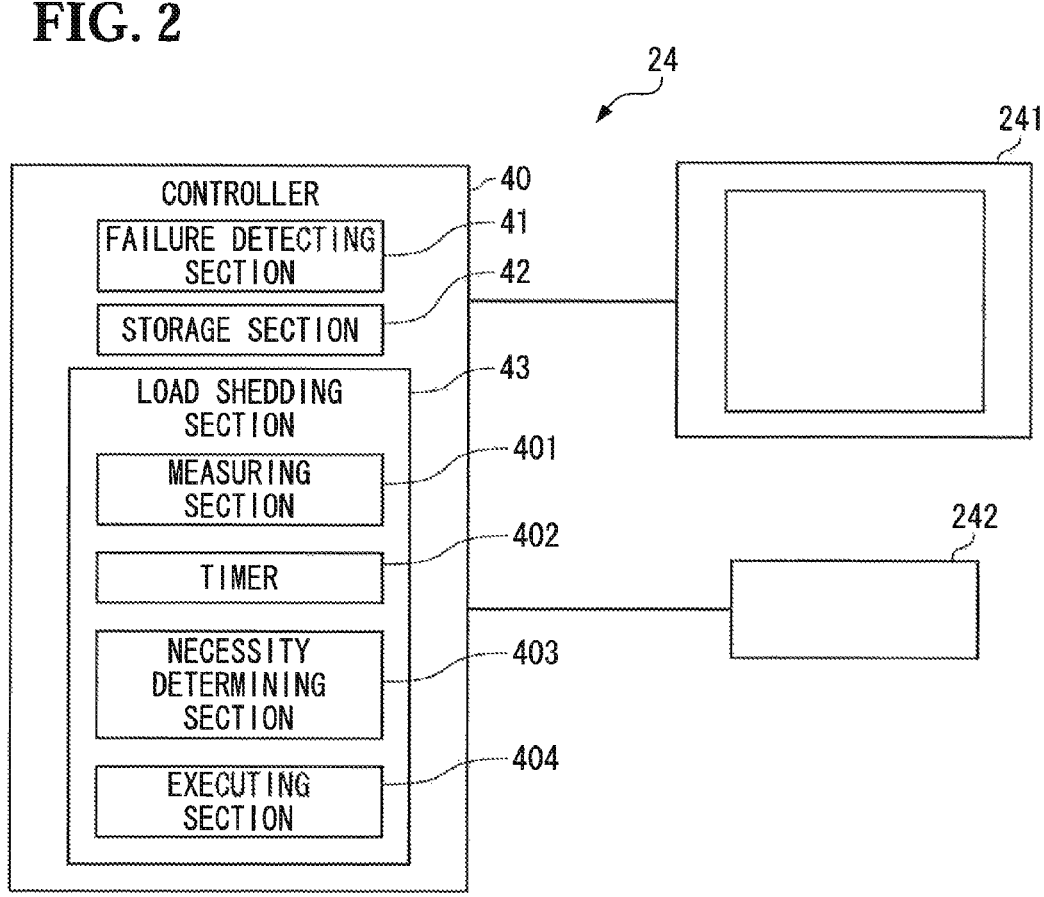
FIG. 2 is a block diagram showing a configuration of an electronic distribution device.

The electronic distribution device 24 includes, in addition to the circuit breakers 22, as shown in FIG. 2, a controller 40, a display unit 241, and an instructing device 242.

The controller 40 includes a processing unit such as a CPU (Central Processing Unit) and a storage device, causes the display unit 241 to display the states of the circuit breakers 22, and accepts the operations of the instructing device 242 that gives instructions to execute menus and commands displayed on the display unit 241 to change the states of the circuit breakers 22.

The controller 40 includes a failure detecting section 41, a storage section 42, and a load shedding section 43. The load shedding section 43 can be configured as a computer program for executing load shedding that isolates the target devices 3B from the power supplying system 2.

The failure detecting section 41 detects a failure hindering the generator 11 from generating the power.

Here, the failure detecting section 41 detects, in addition to the failure of the generators 11 themselves, a failure in the engines 1 equipped with the generators 11 as a failure hindering the generator 11 from generating the power. The detection of the failure is executed using, for example, current generated from by the generators 11. The failure hindering the generator 11 from generating the power is detected on the basis of the current becoming zero or below a predetermined threshold value.

The storage section 42 stores, as shown in FIG. 3, table data 420 that represents correspondences between the IDs (Identifiers) of the target devices 3B and priorities 1 to 5 given to each of the target devices 3B.

The priorities is given on the basis of the degrees of importance or the degrees of influence of the target devices 3B, and "1" denotes the lowest priority and "5" denotes the highest priority. The load shedding is started with the priority 1, and then executed while incrementing the priority step-by-step up to a required priority, like the priority 2, priority 3, priority 4, and priority 5.

It is preferable to define the priorities 1 to 5 from the viewpoint of whom and how much the load shedding affects, as shown in Table 1.

TABLE 1

| | |
|---|---|
| PRIORITY 1 | NO INFLUENCE ON CREW (MAINLY USED IN PARKING) OR INFLUENCE ONLY ON FLIGHT ATTENDANTS |
| PRIORITY 2 | INFLUENCE ON PASSENGERS (LOW DEGREE OF INFLUENCE) |
| PRIORITY 3 | INFLUENCE ON PASSENGERS (MIDDLE DEGREE OF INFLUENCE) |
| PRIORITY 4 | INFLUENCE ON PASSENGERS (HIGH DEGREE OF INFLUENCE) |
| PRIORITY 5 | LIMITED INFLUENCE ON PILOT |

Target devices 31 that are given the priority 1 are those mainly used in parking and having no connection with flight, or those that flight attendants use for the services provided to passengers, including, for example, lighting fixtures in a flight deck, illumination lights on wings, and a hot water boiler in a galley.

Some of lighting fixtures in an entrance area and some of lighting fixtures in the galley are given the priority 1. In order to minimize the influence on the flight attendants when the load shedding is executed for the priority 1, the priority 1 is given to some of the lighting fixtures in an entrance area and some of lighting fixtures in the galley.

Target devices 32 given the priority 2 are devices that are not given the priority 1 among the devices mainly used in parking or used by the flight attendants, or devices having influence on the passengers.

The devices used by the passengers that are not under the necessity and have a low degree of influence are given the priority 2. The devices having the low degree of influence includes, for example, lighting fixtures on the wall in a cabin, audio/visual equipment for playing music/video, reading lights, and flight attendant call lights.

Target device 33 given the priority 3 are devices used by the passengers that have a degree of influence higher than those having the priority 2, including, for example, ceiling lights in a lavatory/washroom, toilet flushers, valves provided in piping for supplying/draining water to/from the lavatory, and anti-icing heaters provided in the piping.

In addition, the priority 3 is given to one of two recirculation fans provided for making air in the cabin more comfortable.

Target devices 34 given the priority 4 are those having a higher degree of influence on the passenger than those having the priority 3. In the present embodiment, the priority 4 is given to another recirculation fan, and an air-conditioning fan in a cargo compartment.

The target devices 35 given the priority 5 are those having a limited influence on a pilot. A plurality of windshields (windows) provided in a cockpit each include an antifogging heater built therein, and even if one of the windshields gets fogged, the safety of the flight can be secured. Thus, the heater build in one of the windshields is given the priority 5.

The power supply to the target devices 3B categorized into the priorities 1 to 5 as described above are cut off by opening the circuit breakers 22 by the load shedding section 43.

A required time that is taken for moving electromagnets constituting the circuit breakers 22 to open the respective circuit breakers for the target devices 31 having the priority 1 is defined as 0.5 seconds leaving a margin, for example. In the present embodiment, the required time for the priorities 2, 3, 4, 5 are similarly defined as 0.5 seconds.

In this case, a required time $T_L$ taken for opening all the circuit breakers for the target devices 3B having the priorities 1 to 5 is defined as 2.5 seconds.

Note that different required times may be defined for each priority.

The required time $T_L$ taken for executing the load shedding may be set, as will be described hereafter, according to the progress of the load shedding executed on the basis of monitoring for a certain period of time. For example, when the load shedding is executed up to the priority 2, a period of time taken for opening the circuit breakers for the target devices 3B having the remaining priorities 3 to 5 can be defined as the required time $T_L$.

The storage section 42 also stores, in addition to the table data 420, the five-minute capacity $W_{5M}$ and the stationary capacity W, and a first monitoring time T1 and a second monitoring time T2 to be described hereafter.

The load shedding section 43 operates when the failure detecting section 41 detects a failure in the generators 11 during the parking and the flight of the aircraft. The load shedding section 43 executes the load shedding while incrementing the priority from 1 to 5 with respect to the target devices 3B step-by-step on the basis of the power supply and demand determined from the power consumption (demand) and the power-generation capacity, and the characteristics of the generators 11.

The load shedding section 43 includes a measuring section 401 for measuring the power consumption, a timer 402 for clocking an elapsed time from a predetermined point in time, and a necessity determining section 403 and an executing section 404 for executing the load shedding up to a required priority at predetermined timings.

The measuring section 401 obtains a power consumption Wd from a wattmeter for measuring the power consumed through the power supplying system 2 by all the devices 3 electrically connected to the power supplying system 2.

The timer 402 clocks the first monitoring time T1 and the second monitoring time T2 that are used for determining the necessity of the load shedding.

The first monitoring time T1 and the second monitoring time T2 are determined on the basis of the five-second property and the five-minute property of the generators 11, and the required time $T_L$ taken for executing the load shedding to the target devices 3B.

The first monitoring time T1 is a time obtained by subtracting the required time $T_L$ from five seconds.

The second monitoring time T2 is a time obtained by subtracting the required time $T_L$ from five minutes.

In the present embodiment, since the required time $T_L$ is 2.5 seconds, the first monitoring time T1 is 2.5 seconds, and the second monitoring time T2 is 4 minutes and 57.5 seconds.

The necessity determining section 403 monitors the power consumption Wd that is continuously obtained from the measuring section 401, and determines the necessity of the load shedding on the basis of whether or not the state where the power consumption Wd exceeds a predetermined power-generation capacity continues for a predetermined period of monitoring time (first monitoring time T1 and second monitoring time T2).

The executing section 404 executes the load shedding if the necessity determining section 403 determines the load shedding is needed.

A failure hindering the generator 11 from generating the power can cause a shortage of the power-generation capacity against the power consumption Wd (overload).

At this point, the generator 11 that normally operates is allowed a power-generation capacity (five-second capacity $W_{5S}$ and five-minute capacity $W_{5M}$) larger than the stationary capacity W, only for a short time, so the shutdown of the power generation by a protective function of the generator 11 does not immediately occur. Using this grace period, the necessity determining section 403 takes a monitoring time for properly determining the necessity of the load shedding, and waits for the monitoring time to elapse before executing the load shedding. The load shedding is then executed step-by-step up to a required priority on the basis of the monitoring of the power consumption Wd.

The load shedding executed by electronic distribution device 24 will be next described with reference to FIG. 4 to FIG. 6.

Figure 4:
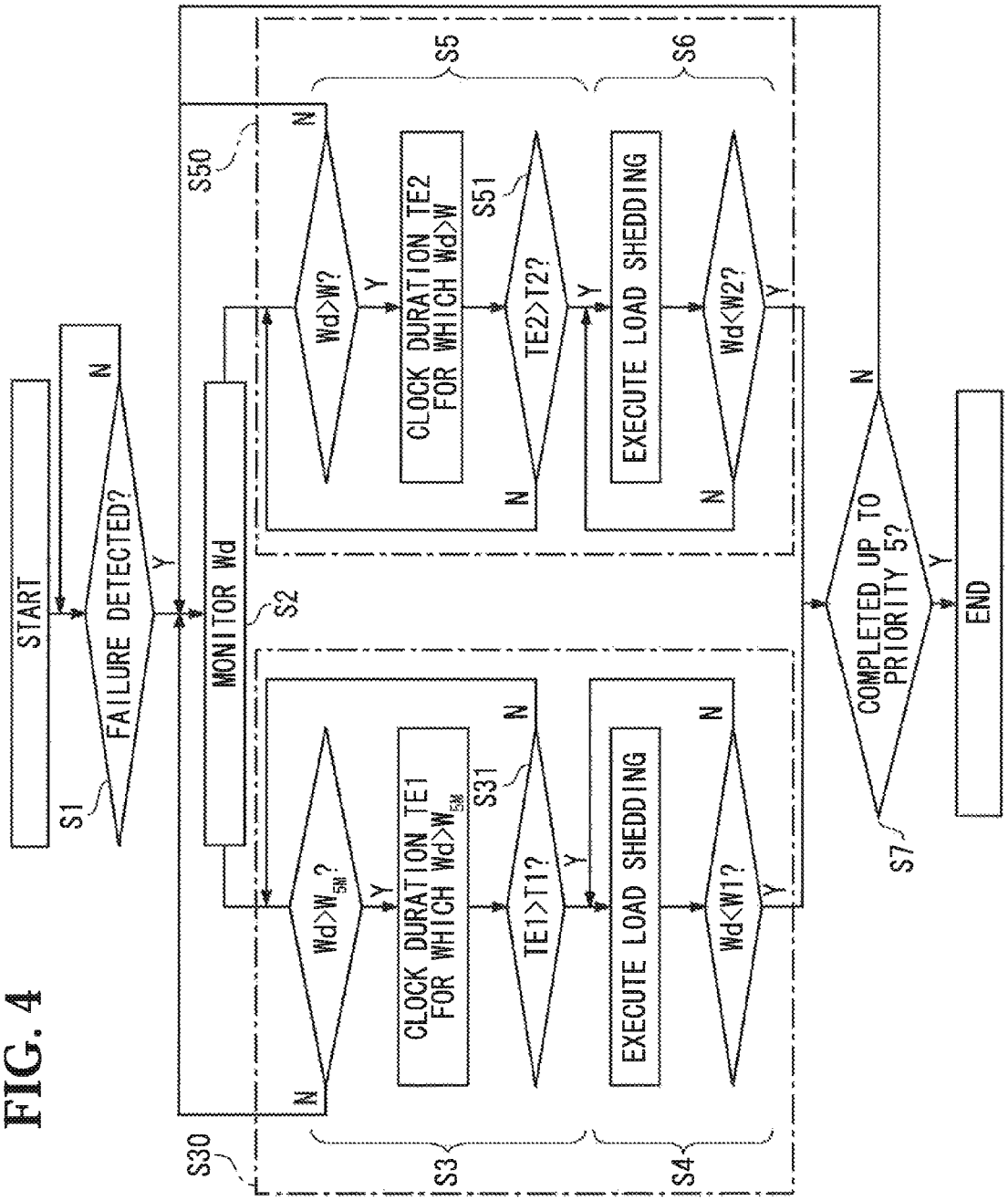
FIG. 4 is a flow diagram showing the outline of processing of load shedding.

First, as shown in FIG. 4, the failure detecting section 41 detects a failure hindering the generator 11 from generating the power (failure detection step S1).

When a failure is detected (Y at step S1), the necessity determining section 403 starts monitoring the power consumption Wd with the measuring section 401 (monitoring step S2).

The load shedding section 43 further executes a first period load-shedding step S30 the processing time of which is in units of five seconds (first period), and a second period load-shedding step S50 the processing time of which is in units of five minutes (second period).

The first period load-shedding step S30 and the second period load-shedding step S50 are repeatedly executed in parallel.

In the present embodiment, when the first period load-shedding step S30 is finished for the first time (the first load shedding), the second period load-shedding step S50 is started.

In the following processing, the storage section 42 stores a "current priority" being a priority of the devices waiting for the load shedding. It is assumed that the current priority is initialized to "priority 1" in advance.

There will be described below an example in which executing the second period load shedding follows executing the first period load shedding.

The first period load-shedding step S30 includes a first period load-shedding determination step S3 and a first period load-shedding execution step S4.

In the first period load-shedding determination step S3, the timer 402 clocks an excess duration TE1 during which the state where the power consumption Wd being monitored exceeds the five-minute capacity $W_{5M}$ continues.

When the excess duration TE1 reaches the first monitoring time T1 (2.5 seconds), the necessity determining section 403 determines that the load shedding needs to be executed (Y at step S31).

Following the determination, the executing section 404 executes the first period load shedding (first period load-shedding execution step S4).

When the excess duration TE1 is less than the first monitoring time T1, the necessity determining section 403 determines that the load shedding does not need to be executed (N at step S31), the load shedding is not executed, and the monitoring the power consumption Wd is continued.

In the first period load-shedding execution step S4, the executing section 404 executes the load shedding to the target devices having a priority specified on the basis of the table data 420 while incrementing the priority by one, until the power consumption Wd measured by the measuring section 401 falls below a first failure period capacity W1, which is obtained by subtracting the margin from the five-minute capacity $W_{5M}$. At this point, the load shedding is executed while the priority is advanced at intervals of 0.5 seconds on the basis of a time taken for executing the load shedding at each priority.

Figure 6:
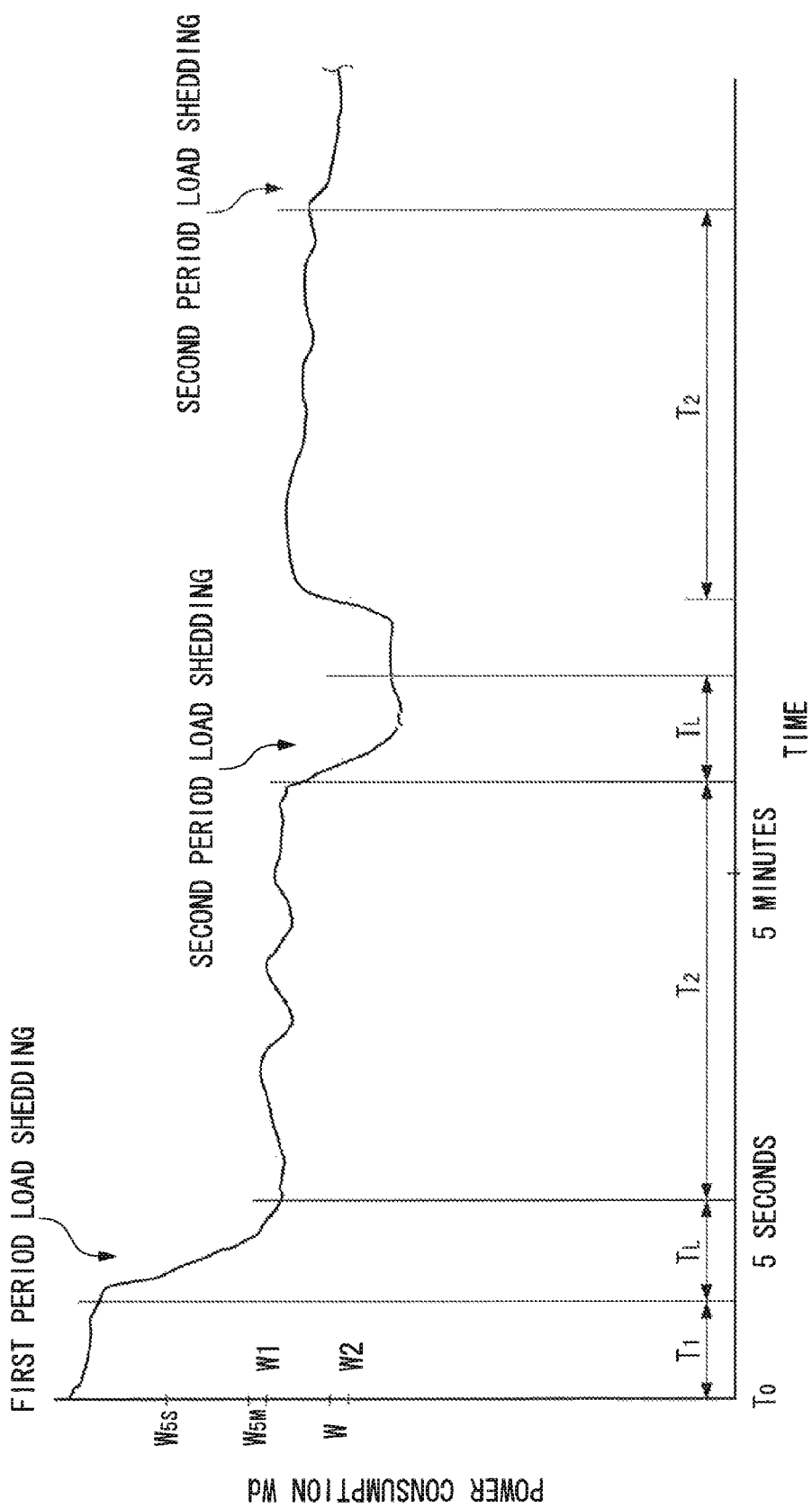
FIG. 6 is a diagram showing temporal change in power consumption, in which a vertical axis denotes power consumption of all the devices connected to a power supplying system, and a horizontal axis denotes elapsed time from the occurrence of a failure.

Even supposing that the load shedding is executed to all the target devices 3B having the priorities from the priority 1 to the priority 5, the required time $T_L$ taken for isolating these target devices 3B from the power supplying system 2 is within 2.5 seconds, and the first load shedding of the first period load shedding therefore completes in five seconds including the first monitoring time T1, from a failure detection time point $T_0$ (FIG. 6).

The first failure period capacity W1 is set at a value obtained by subtracting a margin of, for example, some kvar from the five-minute capacity $W_{5M}$. Setting the first failure period capacity W1 obtained by subtracting the margin from the five-minute capacity $W_{5M}$ allows the load shedding to be executed until the power consumption Wd securely falls below the five-minute capacity $W_{5M}$.

Here, only for the purpose to avoid an overload at a time when five seconds elapsed from the failure detection time point $T_0$, it is enough to control the power consumption Wd to be lower than or equal to the five-second capacity $W_{5S}$ by the first load shedding of the first period load shedding executed within five seconds from the failure detection time point $T_0$.

However, in the present embodiment, the second period load shedding is executed on the basis of the necessity determination on the load shedding, after waiting almost five minutes (second monitoring time T2) from executing the first load shedding, and it is therefore required to reduce the power consumption Wd below the five-minute capacity $W_{5M}$ within the waiting time so as to avoid the overload occurring at the time when five minutes elapses from the failure detection time point $T_0$.

In the present embodiment, consequently, at the time of the first load shedding, the load shedding is started with the priority 1 up to a required priority while incrementing the priority such that the power consumption Wd falls below the first failure period capacity W1.

For example, as shown in FIG. 6, the power consumption Wd is reduced in the first load shedding.

There will be described a specific example with respect to the above-described first load shedding in the first period load shedding executed when the power consumption Wd continuously exceeds the five-minute capacity $W_{5M}$ for the first monitoring time T1 (2.5 seconds), with reference to FIG. 5.

The executing section 404 transmits control signals to the circuit breakers 22 corresponding to the target devices 31 having the priority 1 being the current priority, respectively, on the basis of the table data 420 to open the circuit breakers 22, so as to isolate the target devices 31 from the power supplying system 2 (execution step S41 for priority 1).

In addition, the executing section 404 increments the current priority (priority 1) to the priority 2, and causes the storage section 42 to store the priority 2 as the current priority (priority incrementing step S42).

As described above, isolating the target devices 31 given the priority 1 from the power supplying system 2 reduces the power consumption Wd consumed by the devices 3 connected to the power supplying system 2.

However, if the power consumption Wd measured thereafter still exceeds the first failure period capacity W1, the load shedding needs to be executed to the target devices 3B given a higher priority.

In this case, the executing section 404 isolates, for the priority 2 being the current priority, the circuit breakers 22 corresponding to the target devices 32, respectively, from the power supplying system 2 after 0.5 second from the execution of the load shedding for the priority 1 in a manner similar to that described above (execution step S43 for priority 2). The executing section 404 further increments the priority, and causes the storage section 42 to store the priority 3 as the current priority (priority incrementing step S44).

As with the above, if the power consumption Wd measured still thereafter exceeds the first failure period capacity W1, the load shedding is executed while extending the range of the target devices 3B step-by-step so as to include those given a higher priorities such as the priority 3, the priority 4 and the priority 5, in a manner similar to that described above.

When the load shedding is executed up to the priority 5 (Y at highest priority determination step S7 of FIG. 4), the load shedding section 43 terminates the process, and does not execute the second period load shedding.

It is assumed here that the power consumption Wd falls below the first failure period capacity W1 by isolating the target devices 31 given the priority 1 and the target devices 32 given the priority 2 from the power supplying system 2.

As described above, the first period load shedding is executed while the priority is advanced step-by-step until the power consumption Wd falls below the first failure period capacity W1.

The monitoring of the power consumption Wd is continued thereafter. Operating control surfaces, which is accompanied by a large amount of power consumption, may cause the power consumption Wd to exceed the five-minute capacity $W_{5M}$ again. If the excess duration TE1 during which the state where the power consumption Wd exceeds the five-minute capacity $W_{5M}$ continues reaches the first monitoring time T1 (Y at step S31), the load shedding is started with the current priority, as with the above.

In the present embodiment, the second period load-shedding step S50 follows the first load shedding in the first period load shedding.

The second period load-shedding step S50 includes a second period load-shedding determination step S5 and a second period load-shedding execution step S6.

In the second period load shedding, it is required to control the power consumption Wd to be lower than the stationary capacity W which is lower than five-minute capacity $W_{5M}$ being a benchmark in the first period load shedding, so it can be determined that the second period load shedding is needed even if the power consumption Wd does not vary after the first load shedding is executed.

In the second period load-shedding determination step S5, if an excess duration TE2 during which the state where the power consumption Wd exceeds the stationary capacity W continues reaches the second monitoring time T2 (4 minutes and 57.5 seconds), the necessity determining section 403 determines that additional load shedding needs to be executed (Y at step S51).

Following the determination, the executing section 404 executes the second period load shedding (second period load-shedding execution step S6).

In step S6, the executing section 404 executes the load shedding while advancing the current priority at intervals of 0.5 second until the power consumption Wd measured by the measuring section 401 falls below a second failure period capacity W2, which is obtained by subtracting the margin from the stationary capacity W.

The second failure period capacity W2 is set at a value obtained by subtracting, for example, some kvar from the stationary capacity W.

When the excess duration TE2 during which the state where the power consumption Wd exceeds the stationary capacity W continues is less than the second monitoring time T2, the necessity determining section 403 determines that the load shedding is not needed (N at step S51), and the monitoring of the power consumption Wd is continued.

Figure 5:
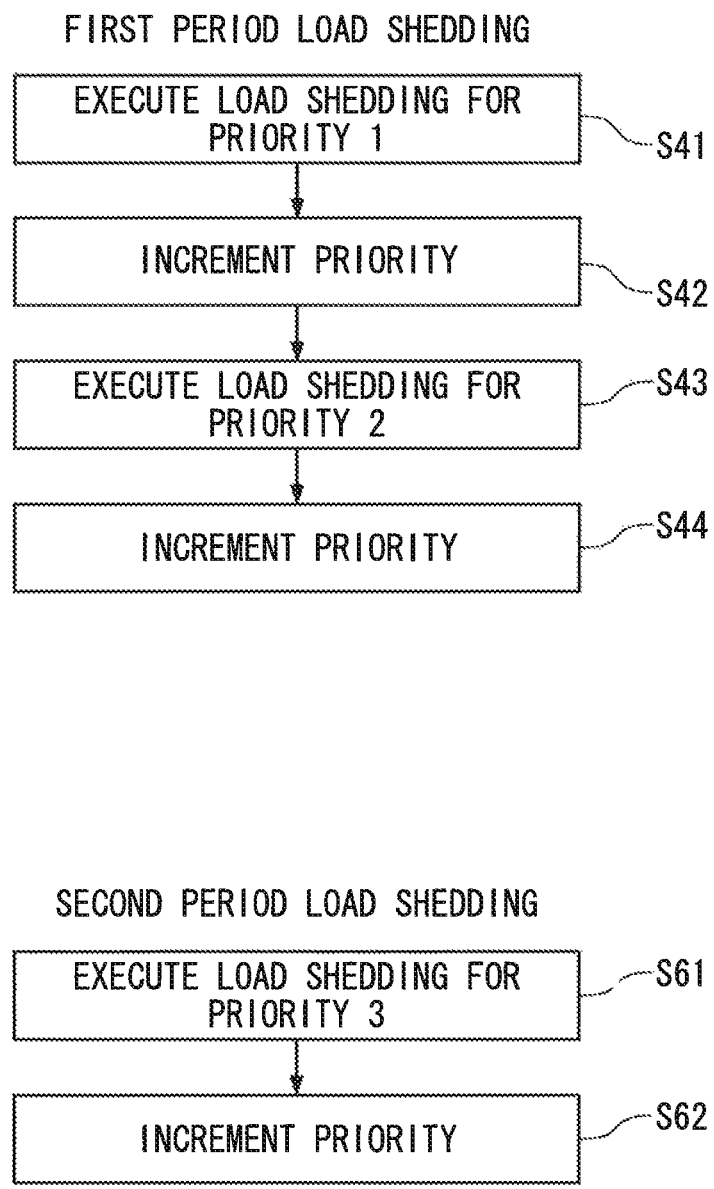
FIG. 5 is flow diagrams showing the process of a first period load shedding and the process of second period load shedding, in detail.

There will be also described a specific example with respect to the second period load shedding, with reference to FIG. 5.

The executing section 404 transmits control signals to the circuit breakers 22 corresponding to the target devices 31 given the priority 3 being the current priority on the basis of the table data 420 to open the circuit breakers 22, so as to isolate the target devices 31 from the power supplying system 2 (execution step S61 for priority 3).

In addition, the executing section 404 increments the current priority (priority 3) to the priority 4, and causes the storage section 42 to store the priority 4 as the current priority (priority incrementing step S62).

As with the above, if the power consumption Wd measured still thereafter exceeds the second failure period capacity W2, the load shedding is executed for priority 4 and the priority 5 step-by-step.

It is assumed here that the power consumption Wd falls below the second failure period capacity W2 by isolating the target devices 33 given the priority 3 from the power supplying system 2.

The monitoring of the power consumption Wd is continued thereafter. If the power consumption Wd exceeds the stationary capacity W again and the excess duration TE2 from that point reaches the second monitoring time T2, the load shedding is started with the current priority, as with the above.

FIG. 6 shows an example in which operating the control surfaces causes the power consumption Wd to exceed the stationary capacity W again after the load shedding up to the priority 3 is executed as described above. In this example, since the state where the power consumption Wd exceeds the stationary capacity W continues for the second monitoring time T2 (shown in the right side of FIG. 6), the load shedding is executed to the target devices 34 given the priority 4.

The monitoring of the power consumption Wd is continued thereafter, and the load shedding can be executed to a target device 35 given the priority 5 as needed. When the load shedding is executed up to the priority 5 (Y at step S7), the load shedding section 43 terminates the process.

When the load shedding is completed up to the priority 5, only the devices 3A are connected to the power supplying system 2. In this state, even if all the devices 3A operate on the maximum power consumption Wd, the power consumption Wd can be met with the stationary capacity W obtained by the generation by the one generator 11.

There has been described above the process of the load shedding executed in the case where the power supply 10 is configured by only one of the generators 11, and the process of the load shedding is interrupted if the possibility of the overload is prevented by the return of the other generator 11 from the failure or the connection of the power supplying system 2 to the an external power supply installed on the ground. When the external power supply is connected to the power supplying system 2, the external power supply configures the power supply 10 in place of the broken generator 11, so the capacity of the power supply 10 is sufficiently recovered.

As a result, when detecting that the generator 11 is returned from the failure, or the external power supply is connected, the load shedding section 43 interrupts the process.

In the present embodiment, even if the return of the generator 11 or the connection of the external power supply recovers the power supply 10, the power supply to the target devices 3B given priorities for which the load shedding has already been executed is not automatically resumed. If the power supplying to the target devices 3B is automatically resumed although the power supply is once stopped, it becomes difficult to grasp available target devices 3B in the current situation.

As described above, the main feature of the present embodiment is to determine the necessity of the load shedding on the basis of the results of monitoring the power consumption Wd and to execute the load shedding up to a required priority on the basis on the priorities given to the target devices 3B.

In general, a rated maximum power consumption specified to each device 3 is defined with a large margin added with respect to a power consumption in a normal use of the device. As a result, the determination of the necessity of the load shedding based on the power consumption obtained by integrating the rated maximum power consumptions of the devices 3 results in a tight power supply and demand for only one of the generators 11.

However, using even all the devices 3 simultaneously consumes in reality only about half of the total maximum power consumed by the devices 3, so the power-generation capacity W leaves a large margin. In this case, it is enough to execute the limited load shedding to some of the target devices 3B.

As a result, like the present embodiment, executing the load shedding to the target devices 3B up to a required priority after determining the necessity of the load shedding on the basis of the monitoring of power consumption Wd allows for avoiding excessively cutting off the power supplying to a large number of the target device 3B, which can maintain the power supply to the target devices 3B given higher priorities.

In addition, in the load shedding in the present embodiment, the first period load shedding in the unit of five seconds and the second period load shedding in the unit of five minutes are executed in parallel on the basis of the properties of the generators 11. Since the five-minute capacity $W_{5M}$ of the generator 11 is greater than the stationary capacity W, the first period load shedding, which uses the first failure period capacity W1 based on the five-minute capacity $W_{5M}$ as a threshold value used for advancing the priority, leaves a larger margin of power-generation capacity than that of the second period load shedding, which uses the second failure period capacity W2 based on the stationary capacity as the threshold value.

As a result, in the first period load shedding, the load shedding can be limited to lower priorities. The target devices 3B given higher priorities can be thereafter continuously used for about five minutes until the second period load shedding is executed. If, in the meantime, the aircraft is connected to the external power supply or the activation of an auxiliary power unit is completed, as will be described hereafter, and the capacity of the power supply 10 is recovered, the load shedding is interrupted at that point. That is, if the power supply 10 can hold until recovered while executing the load shedding to the necessary extent without an overload, the target devices 3B given higher priorities can be used thereafter with no concern over the cutting off of the power supply.

The process regarding to the auxiliary power unit in the load shedding will be described below.

The auxiliary power unit (APU) operates to develop a thrust in the case where a failure occurs in the engine 1, and includes a generator. The auxiliary power unit typically has a limit of an altitude within which it is available. In addition, the auxiliary power unit takes an activation time of about some minutes from the start to the completion of activation thereof.

Figure 7:
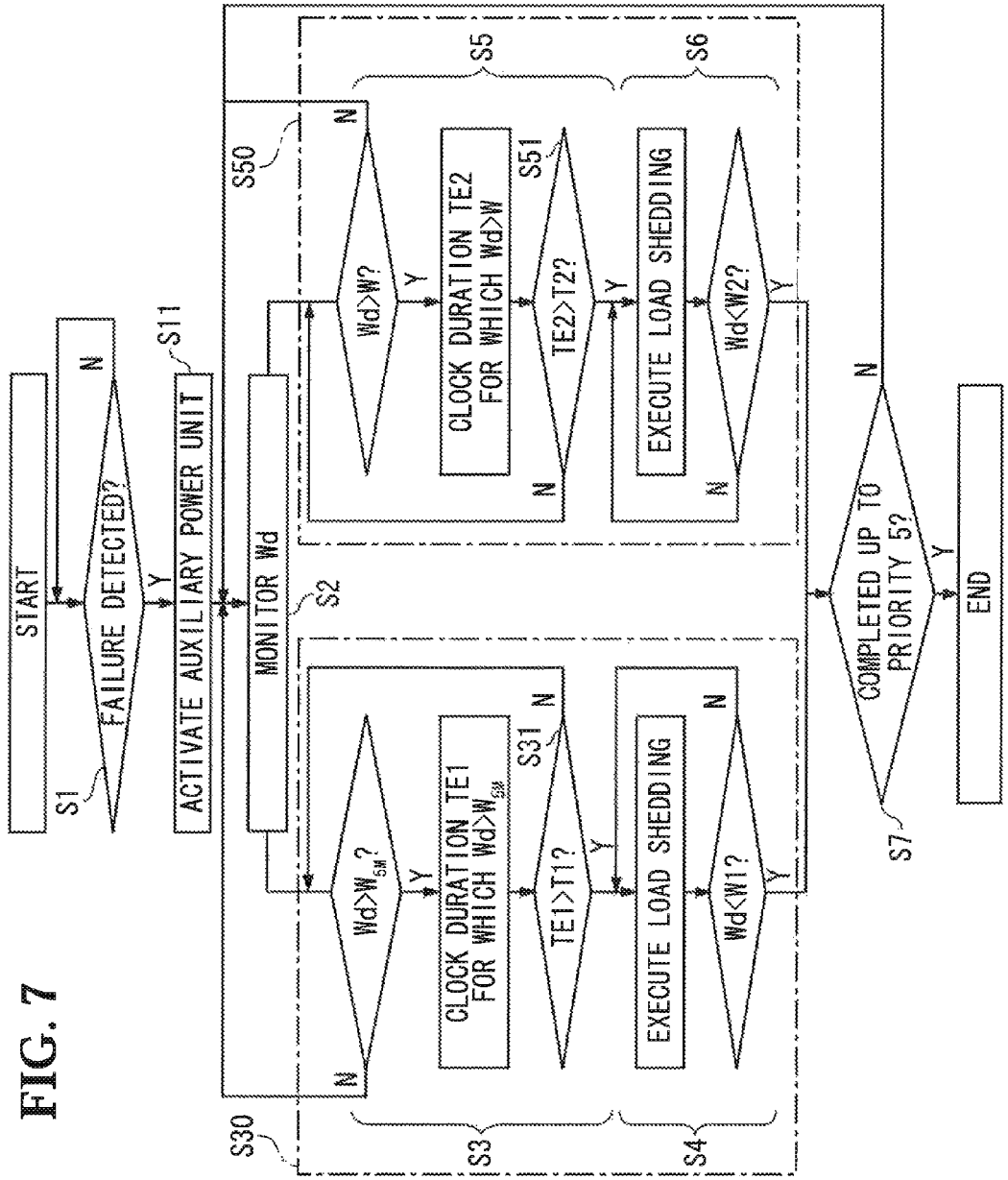
FIG. 7 is a flow diagram illustrating a process regarding an auxiliary power unit in load shedding.

As shown in FIG. 7, when a failure hindering the generator 11 from generating power (step S1), the auxiliary power unit is activated if the altitude of the aircraft is lower than a predetermined flight altitude (step S11). In addition, the monitoring of the power consumption Wd is started (step S2).

The necessity of the first period load shedding is thereafter determined as with the above (step S3), and the first period load shedding is executed as needed (step S4), the necessity of the second period load shedding is determined (step S5), and the second period load shedding is executed as needed (step S6).

When the activation of the auxiliary power unit is completed in these steps, the generator of the auxiliary power unit starts generating power. By the generator configuring the power supply 10, the capacity of the power supply 10 is recovered. As a result, the load shedding section 43 interrupts the process when detecting that the activation of the auxiliary power unit is completed.

Furthermore, if the auxiliary power unit cannot be activated in step S11 for some reason including the restrictions on altitude, the activation of the auxiliary power unit is retried. When the activation of the auxiliary power unit is started because the flight altitude is lowered, and the activation is completed, the load shedding section 43 interrupts the process. The power supply to the target devices 3B given priorities higher than the current priority can be thereafter maintained.

The process of the load shedding and the configuration for executing the load shedding described in the above embodiment are merely one example.

There has been described the example in which the load shedding is determined to be needed in both the necessity determination in the first period load shedding (step S31) and the necessity determination in the second period load shedding (step S51), the load shedding may be determined not to be needed in either or both of step S31 and step S51, depending on the circumstance of the power supply and demand.

In addition, the first period load-shedding execution step S4 may be executed a plurality of times before executing the second period load-shedding execution step S6.

The present invention further allows the resumption of the power supply to the target devices 3B that have already been subjected to the load shedding when the connection of the external power supply, the return of the generator 11 from the failure, and the completion of the activation of the auxiliary power unit recovers the capacity of the power supply 10.

In the above embodiment, there has been described the example of the aircraft including two generators, but the number of the generators is optional. For example, in the case of an aircraft including four generators, the present invention can be applied to load shedding executed when one to three of generators break down. In this case, it is preferable that the five-minute capacity $W_{5M}$ and the stationary capacity W are set at values in accordance with the number of broken generators.

In the present invention, the priorities given to the target devices are defined on the basis of the degrees of importance or the degrees of influence based on the usages or characteristics of the respective target devices, and devices given a higher priority are to be subjected to the load shedding later. In the case where, with priorities having opposite meaning to such a meaning, a higher priority is given to a device that is to be subjected to the load shedding earlier due to having a lower degree of importance or degree of influence, the load shedding may be started with the highest priority, and executed while decrementing the priority down to a lower priority.

Apart from the above, the configuration described in the aforementioned embodiment may be chosen or changed to other configurations as appropriate without departing from the gist of the present invention.

What is claimed is:

1. A method of load shedding in an aircraft, being a method of load shedding to cut off supply of power to a plurality of target devices selected from a device group, the power generated by generators included in the aircraft and supplied to the device group, the method of load shedding comprising:
  a failure detection step of detecting a failure hindering the generator from generating; and
  a load-shedding step, after the failure is detected in the failure detection step, of executing the load shedding on the basis of determination of necessity of the load shedding, wherein
  the load-shedding step includes:
  a first period load-shedding step, a processing time of which is in units of a predetermined first period;
  a second period load-shedding step, a processing time of which is in units of a second period longer than the first period;
  a determination step of determining that the load shedding is needed on the basis that a state where power consumption consumed by the devices exceeds a predetermined power-generation capacity continues for a predetermined monitoring time; and
  an execution step of executing, if the load shedding is determined to be needed in the determination step, the load shedding step-by-step while advancing a priority given to the target devices until the power consumption falls below the power-generation capacity;
  wherein in the first period load-shedding step, the power-generation capacity is set at a capacity in accordance with a property of the generators associated with the second period, and
  in the second period load-shedding step, the power-generation capacity is set at a capacity in accordance with a stationary property of the generators.

2. The method of load shedding in the aircraft according to claim 1, wherein
  in the execution step, the load shedding is executed until the power consumption falls below a failure period capacity set at a value lower than the power-generation capacity.

3. The method of load shedding in the aircraft according to claim 1, the method of load shedding further comprising an auxiliary power unit activation step, after the failure is detected in the failure detection step, of activating an auxiliary power unit including a generator, wherein
a process of the load-shedding step is interrupted when the generator of the auxiliary power unit starts generating power upon completion of an activation of the auxiliary power unit.

4. The method of load shedding in the aircraft according to claim 1, wherein
the power supply to the target devices that have already been subjected to the load shedding is resumed when a capacity of the power is recovered.

5. The method of load shedding in the aircraft according to claim 1, further comprising a monitoring step for monitoring the power consumption consumed by the devices,
wherein the monitoring step is conducted after the failure hindering the generator from generating is detected in the failure detection step and prior to the load-shedding step.

6. A method of load shedding in an aircraft, being a method of load shedding to cut off supply of power to a plurality of target devices selected from a device group, the power generated by generators included in the aircraft and supplied to the device group, the method of load shedding comprising:
a failure detection step of detecting a failure hindering the generator from generating; and
a load-shedding step, after the failure is detected in the failure detection step, of executing the load shedding on the basis of determination of necessity of the load shedding, wherein
the load-shedding step includes:
a first period load-shedding step, a processing time of which is in units of a predetermined first period;
a second period load-shedding step, a processing time of which is in units of a second period longer than the first period;
a determination step of determining that the load shedding is needed on the basis that a state where power consumption consumed by the devices exceeds a predetermined power-generation capacity continues for a predetermined monitoring time; and
an execution step of executing, if the load shedding is determined to be needed in the determination step, the load shedding step-by-step while advancing a priority given to the target devices until the power consumption falls below the power-generation capacity;
wherein in the first period load-shedding step, the power-generation capacity is set at a capacity in accordance with a property of the generators associated with the second period, and
in the second period load-shedding step, the power-generation capacity is set at a capacity in accordance with a stationary property of the generators, wherein
in the first period load-shedding step,
the monitoring time is set at a time obtained by subtracting a time defined as a time taken for cutting off the power supply to the target devices, from the first period, and
in the second period load-shedding step,
the monitoring time is set at a time obtained by subtracting a time defined as a time taken for cutting off the power supply to the target devices, from the second period.

7. A controller for executing load shedding to cut off supply of power to a plurality of target devices selected from a device group, the power generated by generators included in an aircraft and supplied to the device group, the controller comprising:
a failure detecting section for detecting a failure hindering the generator from generating the power;
a storage section for storing a first monitoring time and a second monitoring time, which correspond to a first predetermined capacity and a second predetermined capacity, respectively, said second monitoring time being longer than said first monitoring time; and
a load shedding section for operating when the failure detecting section detects the failure, wherein the load shedding section includes:
a determining section for determining that the load shedding is needed on the basis that the state where power consumption consumed by the devices exceeds the first or second predetermined power-generation capacity continues for the first or second monitoring time, respectively; and
an executing section for executing, if the determining section determines that the load shedding is needed, the load shedding step-by-step while advancing a priority given to the target devices until the power consumption falls below the power-generation capacity;
wherein, the power-generation capacity corresponding to the first monitoring time is set at a capacity in accordance with a property of the generators associated with the second monitoring time, and
the power-generation capacity corresponding to the second monitoring time is set at a capacity in accordance with a stationary property of the generators.

8. An aircraft comprising the controller according to claim 7.

9. The controller according to claim 7, further comprising:
a measuring section for measuring the power consumption consumed by the devices, and
a timer for clocking the predetermined monitoring time.

10. The controller according to claim 9, wherein
the determining section is configured to monitor the power consumption that is continuously obtained from the measuring section (401).

* * * * *